(12) United States Patent
Takeya et al.

(10) Patent No.: US 11,440,524 B2
(45) Date of Patent: Sep. 13, 2022

(54) BRAKE CONTROL DEVICE

(71) Applicant: ADVICS CO., LTD., Kariya (JP)

(72) Inventors: Hirotaka Takeya, Kariya (JP);
Shunsuke Murata, Aichi-ken (JP);
Keita Nakano, Hamamatsu (JP)

(73) Assignee: ADVICS CO., LTD., Kariya (JP)

( * ) Notice: Subject to any disclaimer, the term of this patent is extended or adjusted under 35 U.S.C. 154(b) by 95 days.

(21) Appl. No.: 17/047,240

(22) PCT Filed: Apr. 26, 2019

(86) PCT No.: PCT/JP2019/017834
§ 371 (c)(1),
(2) Date: Oct. 13, 2020

(87) PCT Pub. No.: WO2019/208748
PCT Pub. Date: Oct. 31, 2019

(65) Prior Publication Data
US 2021/0387607 A1 Dec. 16, 2021

(30) Foreign Application Priority Data
Apr. 27, 2018 (JP) .............................. JP2018-087676

(51) Int. Cl.
*B60T 17/22* (2006.01)
*B60T 13/58* (2006.01)
*B60T 13/74* (2006.01)

(52) U.S. Cl.
CPC ............ *B60T 17/221* (2013.01); *B60T 13/58* (2013.01); *B60T 13/746* (2013.01);
(Continued)

(58) Field of Classification Search
CPC .. B60T 17/221; B60T 13/58; B60T 2270/403; B60T 2201/12; B60T 2270/402; B60T 13/746; B60T 8/17; B60T 13/741
See application file for complete search history.

(56) References Cited

U.S. PATENT DOCUMENTS 8,622,179 B2 * 1/2014 Watanabe ............... F16D 65/18
303/113.5
9,180,844 B2 * 11/2015 Murata ..................... B60T 7/22
(Continued)

FOREIGN PATENT DOCUMENTS

| JP | 2014019233 A | | 2/2014 |
| JP | 2016011081 A | | 1/2016 |
| JP | 2020001632 A | * | 1/2020 |

OTHER PUBLICATIONS

International Search Report (PCT/ISA/210) dated Jul. 23, 2019, by the Japanese Patent Office as the International Searching Authority for International Application No. PCT/JP2019/017834.
(Continued)

*Primary Examiner* — Pamela Rodriguez
(74) *Attorney, Agent, or Firm* — Buchanan Ingersoll & Rooney PC

(57) ABSTRACT

The present disclosure provides a brake control device applied to a vehicle including a hydraulic brake device that generates a hydraulic braking force by pressing a braking member with hydraulic pressure toward a member-to-be-braked that rotates integrally with a wheel; and an electric brake device that generates an electric braking force by pressing the braking member by driving a motor toward the member-to-be-braked. A controller that controls the electric brake device is provided. The controller executes, when a predetermined condition is satisfied, a positional control for driving a motor and moving a propeller shaft that transmits the driving force of the motor to the braking member toward the member-to-be-braked as compared to when the predetermined condition is not satisfied.

9 Claims, 8 Drawing Sheets

(52) U.S. Cl.
CPC ..... *B60T 2201/12* (2013.01); *B60T 2270/402* (2013.01); *B60T 2270/403* (2013.01)

(56) References Cited

U.S. PATENT DOCUMENTS

| | | | | |
|---|---|---|---|---|
| 2009/0280959 | A1* | 11/2009 | Bensch | B60T 17/083 |
| | | | | 477/198 |
| 2010/0072811 | A1* | 3/2010 | Kondo | B60T 13/741 |
| | | | | 303/20 |
| 2015/0175137 | A1 | 6/2015 | Murata et al. | |
| 2017/0349153 | A1* | 12/2017 | Yamashita | B60T 8/405 |

OTHER PUBLICATIONS

Written Opinion (PCT/ISA/237) dated Jul. 23, 2019, by the Japanese Patent Office as the International Searching Authority for International Application No. PCT/JP2019/017834.

* cited by examiner

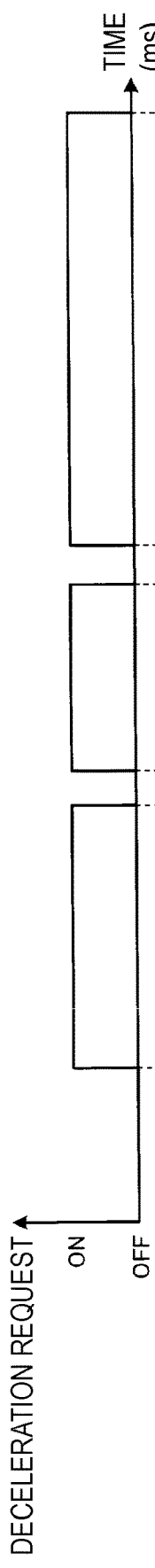
FIG. 7A DECELERATION REQUEST
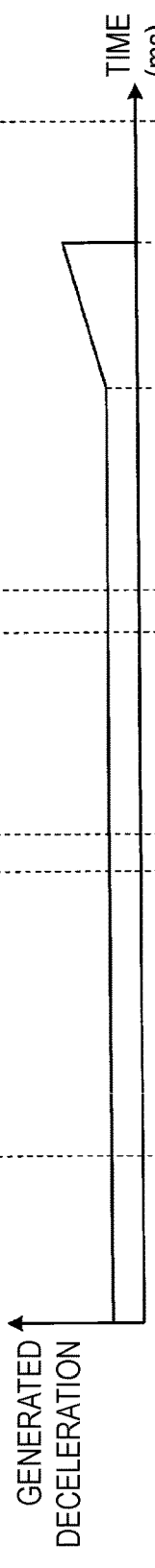
FIG. 7B GENERATED DECELERATION
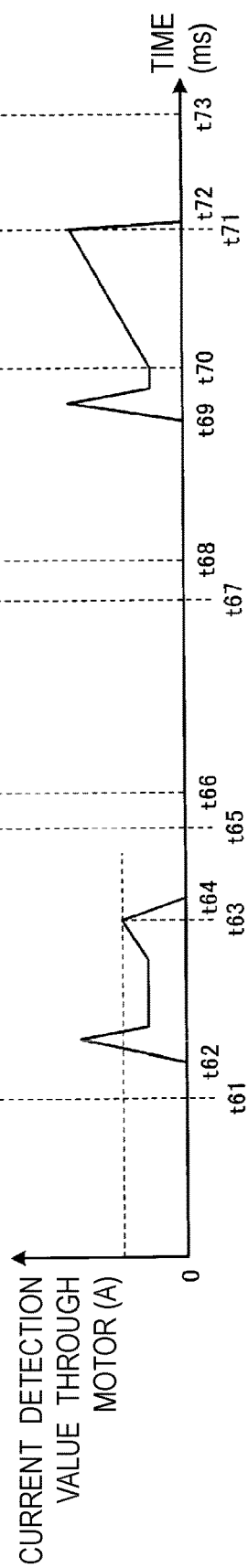
FIG. 7C CURRENT DETECTION VALUE THROUGH MOTOR (A)

BRAKE CONTROL DEVICE

TECHNICAL FIELD

The present disclosure relates to a brake control device.

BACKGROUND ART

In recent years, electric parking brakes (hereinafter, also referred to as EPBs) have been widely used in various vehicles such as passenger cars. The brake control device that controls the EPB, for example, generates an electric braking force by driving a wheel brake mechanism with a motor.

In general, the EPB is often used to prevent unintentional movement of parked vehicles. When decelerating a traveling vehicle, a driver depresses a brake pedal to generate a hydraulic braking force by a hydraulic brake mechanism. As described above, the EPB is premised on the use at the time of parking, and therefore the responsiveness is not taken into consideration. Therefore, the response speed of EPB is slower than the response speed of the hydraulic brake. Furthermore, as a technique for improving the response speed of the hydraulic braking force, it is known to generate in advance a low pressure to the extent that vehicle deceleration does not occur in the hydraulic brake mechanism.

CITATIONS LIST

Patent Literature

Patent Literature 1: Japanese Unexamined Patent Publication No. 2016-11081

SUMMARY OF INVENTION

Technical Problems

However, even when the vehicle is traveling, there are situations where it is effective to use the EPB, for example, at the time an emergency, automatic driving, failure in a hydraulic brake, and the like, and hence it is beneficial to increase the response speed of the EPB. Moreover, in the method of improving the response speed with hydraulic pressure described above, the automatic pressurization control needs to be continuously executed, which causes a problem of power consumption, and it is beneficial to obtain the same effect with the EPB.

Therefore, one of the objects of the present disclosure is to provide, for example, a brake control device capable of increasing the response speed of the hydraulic braking force and the electric braking force.

Solutions to Problems

The present disclosure provides, for example, a brake control device applied to a vehicle including a hydraulic brake device that generates a hydraulic braking force by pressing a braking member with hydraulic pressure toward a member-to-be-braked that rotates integrally with a wheel; and an electric brake device that generates an electric braking force by pressing the braking member by driving a motor toward the member-to-be-braked. The brake control device includes a controller that controls the electric brake device, and the controller executes, when a predetermined condition is satisfied, a positional control for driving the motor and moving a propeller shaft that transmits the driving force of the motor to the braking member toward the member-to-be-braked as compared to when the predetermined condition is not satisfied.

BRIEF DESCRIPTION OF DRAWINGS

FIGS. 7A-7C are graphs showing how the current detection value of the motor changes when a positional control is performed through a fourth method in the EPB of the embodiment, and then a braking control of the EPB is performed thereafter.

DESCRIPTION OF EMBODIMENT

An exemplary embodiment of the present disclosure will be disclosed below. The configurations of the embodiment shown below, and the operations and results (effects) provided by the configurations are merely examples. The present disclosure can also be realized with configurations other than the configurations disclosed in the following embodiment. Furthermore, according to the present disclosure, it is possible to obtain at least one of the various effects (including derivative effects) obtained by the following configuration.

Figure 1:
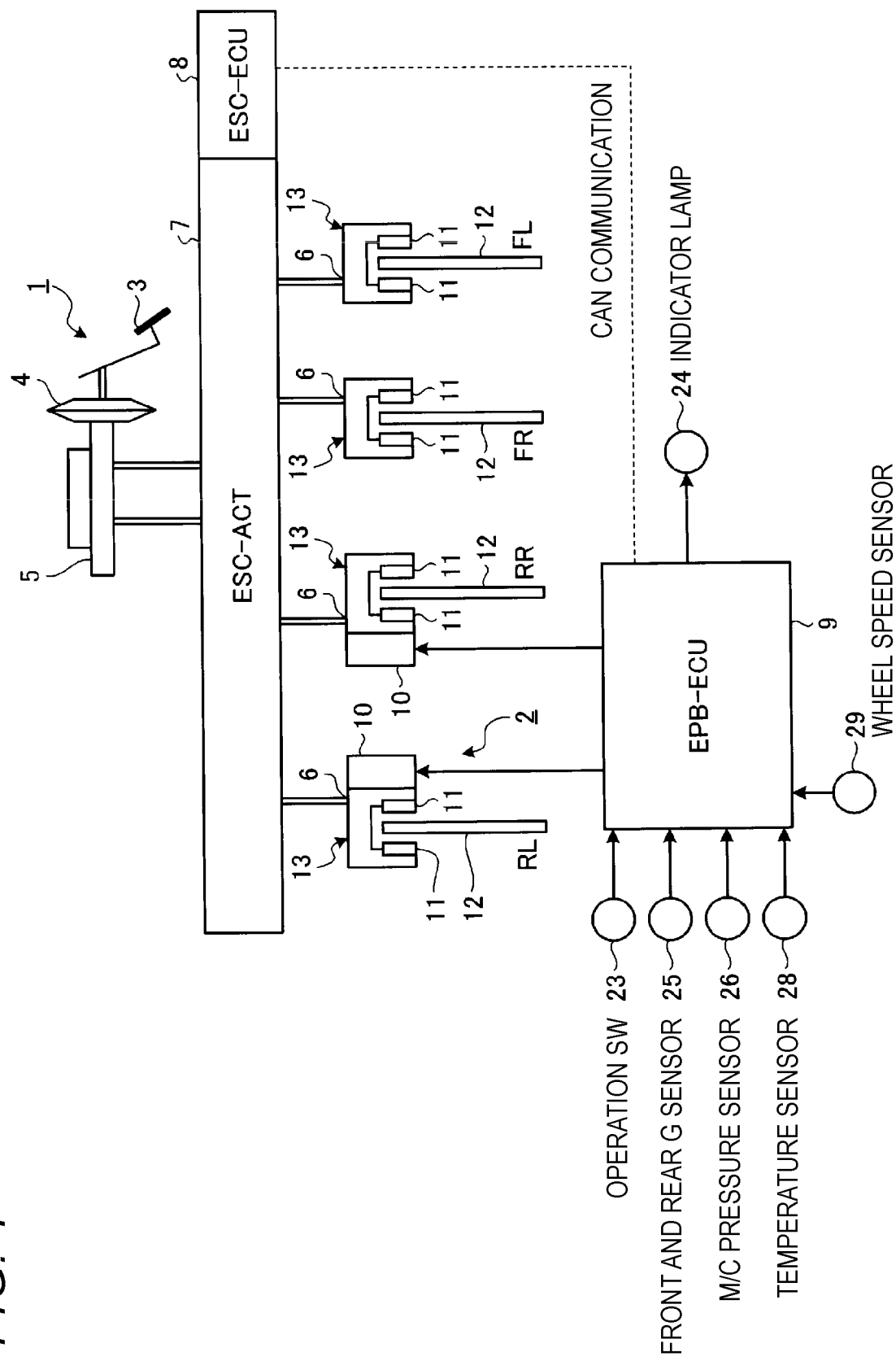
FIG. 1 is a schematic diagram showing an overall outline of a vehicle brake device of an embodiment.
Figure 2:
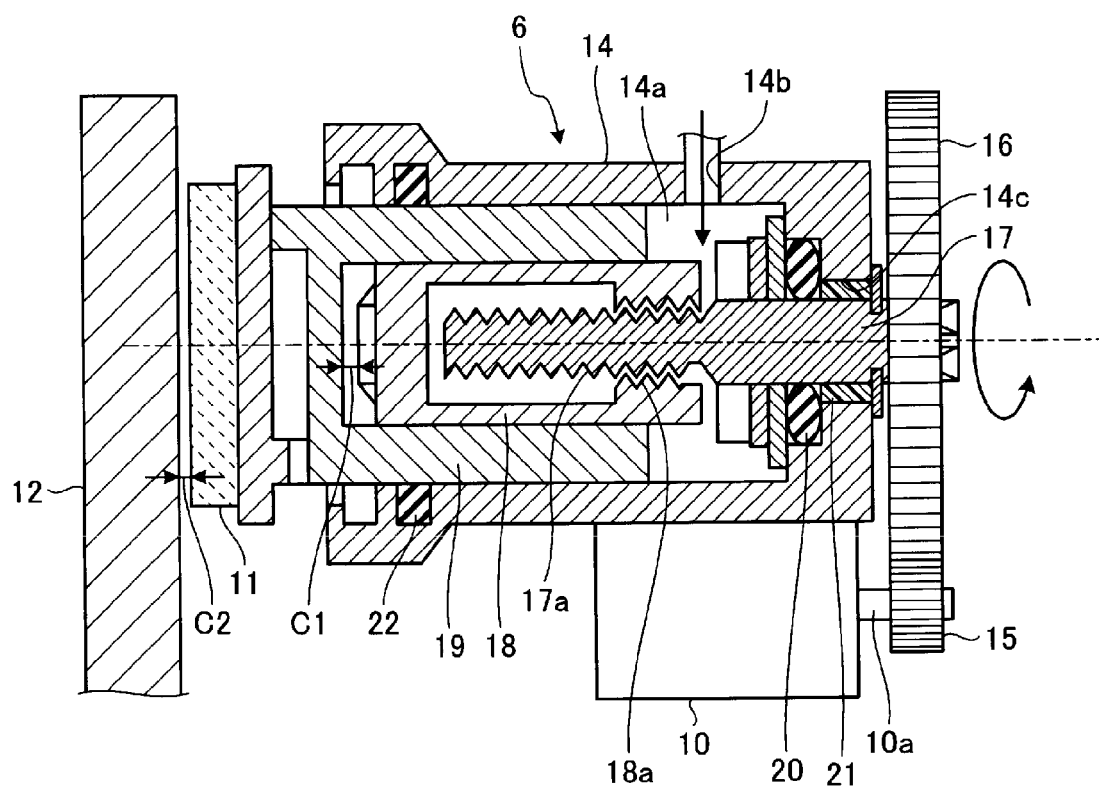
FIG. 2 is a schematic cross-sectional view of a wheel brake mechanism of a rear wheel system provided in the vehicle brake device of the embodiment.

In the present embodiment, a vehicle brake device in which a disc brake type EPB is applied to the rear wheel system will be described by way of an example. FIG. 1 is a schematic diagram showing an overall outline of a vehicle brake device of an embodiment. FIG. 2 is a schematic cross-sectional view of a wheel brake mechanism of the rear wheel system provided in the vehicle brake device of the embodiment. Hereinafter, description will be given with reference to these drawings.

As shown in FIG. 1, the vehicle brake device of the embodiment includes a service brake 1 (hydraulic brake device) and an EPB 2 (electric brake device).

The service brake 1 is a hydraulic brake mechanism that presses a braking member (brake pad 11 in FIG. 2) by hydraulic pressure toward a member-to-be-braked (brake disc 12 in FIG. 2) that rotates integrally with a wheel when a driver depresses a brake pedal 3 to generate a service brake force (hydraulic braking force). Specifically, the service brake 1 boosts the pedaling force corresponding to the depression of the brake pedal 3 by the driver with a booster 4, and then generates a brake hydraulic pressure corresponding to the boosted pedaling force in a master cylinder (hereinafter referred to as M/C) 5. Then, the brake hydraulic pressure is transmitted to a wheel cylinder (hereinafter, referred to as W/C) 6 provided in a wheel brake mechanism of each wheel to generate a service brake force. Furthermore, an actuator 7 for controlling brake hydraulic pressure is provided between the M/C5 and the W/C6. The actuator 7 adjusts the service brake force generated by the service brake 1 and performs various controls (e.g., anti-skid control etc.) for improving the safety of the vehicle.

Various controls using the actuator 7 are executed by an electronic stability control (ESC)-ECU 8 that controls the service brake force. For example, the ESC-ECU 8 outputs a control current for controlling various control valves (not shown) provided in the actuator 7 and a motor for driving the pump to control the hydraulic circuit provided in the actuator 7, and control the W/C pressure transmitted to the W/C6. Wheel slip is thereby avoided, for example, and the safety of the vehicle is improved. For example, the actuator 7 is configured to include, for each wheel, a pressure increasing control valve that controls the application of the brake hydraulic pressure generated in the M/C5 or the brake hydraulic pressure generated by the pump drive with respect to the W/C6, a pressure decreasing control valve that decreases the W/C pressure by supplying brake fluid in each W/C6 to a reservoir, and the like, and performs pressure increasing, maintaining, and decreasing control of the W/C pressure. Furthermore, the actuator 7 can realize the automatic pressurizing function of the service brake 1, and based on the control of the pump drive and various control valves, can automatically pressurize the W/C6 even when there is no brake operation. In addition, in order to improve the response speed of the automatic pressurizing function, a control has been considered in which a low pressure to an extent vehicle deceleration does not occur is applied in advance by the automatic pressurizing function. Since the structure of the actuator 7 is well known in the related art, detailed description thereof will be omitted here.

The EPB 2 generates an electric braking force by driving the wheel brake mechanism by the motor 10, and is configured to include an EPB control device (hereinafter referred to as EPB-ECU) 9 (brake control device, controller) for controlling the drive of the motor 10. Specifically, for example, the EPB2 presses the braking member (brake pad 11 in FIG. 2) by driving the motor 10 toward the member-to-be-braked (brake disc 12 in FIG. 2) to generate the electric braking force so that the vehicle does not move unintentionally when parked. The EPB-ECU 9 and the ESC-ECU 8 transmit and receive information by, for example, Controller Area Network (CAN) communication.

The wheel brake mechanism is a mechanical structure that generates a braking force in the vehicle brake device of the present embodiment, and has a structure in which a wheel brake mechanism of the front wheel system first generates a service brake force by operating the service brake 1. On the other hand, the wheel brake mechanism of the rear wheel system has a common structure that generates a brake force for both the operation of the service brake 1 and the operation of the EPB 2. The wheel brake mechanism of the front wheel system is a wheel brake mechanism that has been conventionally used in general, in which a mechanism for generating the electric braking force based on the operation of the EPB 2 is omitted, as opposed to the wheel brake mechanism of the rear wheel system, and thus the description thereof will be omitted here, and the wheel brake mechanism of the rear wheel system will be described below.

In the wheel brake mechanism of the rear wheel system, not only when the service brake 1 is operated but also when the EPB 2 is operated, the brake pad 11, which is the friction material shown in FIG. 2, is pressed to sandwich the brake disc 12 (12RL, 12RR, 12FR, 12FL) which is a friction object material by the brake pad 11, thus generating a friction force between the brake pad 11 and the brake disc 12, and generating a brake force.

Specifically, the wheel brake mechanism rotates the motor 10 directly fixed to the body 14 of the W/C6 for pressing the brake pad 11 as shown in FIG. 2 in the caliper 13 shown in FIG. 1 to rotate the spur gear 15 provided on the drive shaft 10a of the motor 10. Then, the brake pad 11 is moved by transmitting the rotational force (output) of the motor 10 to the spur gear 16 engaged with the spur gear 15, and the electric braking force by the EPB 2 is generated.

In the caliper 13, in addition to the W/C6 and the brake pad 11, a part of the end face of the brake disc 12 is housed so as to be sandwiched by the brake pad 11. The W/C6 can generate the W/C pressure in a hollow portion 14a, which is the brake fluid storage chamber, by introducing the brake hydraulic pressure into the hollow portion 14a of the cylindrical body 14 through a passage 14b, and is configured to include a rotary shaft 17, a propeller shaft 18, a piston 19, and the like in the hollow portion 14a.

The rotary shaft 17 has one end connected to the spur gear 16 through an insertion hole 14c formed in the body 14, so that when the spur gear 16 is rotated, the rotary shaft 17 is rotated with the rotation of the spur gear 16. A male screw groove 17a is formed on the outer peripheral surface of the rotary shaft 17 at the end of the rotary shaft 17 opposite to the end connected to the spur gear 16. On the other hand, the other end of the rotary shaft 17 is axially supported by being inserted into the insertion hole 14c. Specifically, the insertion hole 14c is provided with a bearing 21 together with the O-ring 20, so that the O-ring 20 prevents the brake fluid from leaking out between the rotary shaft 17 and the inner wall surface of the insertion hole 14c, and the bearing 21 axially supports the other end of the rotary shaft 17.

The propeller shaft 18 is configured by a nut including a hollow tubular member, and has a female screw groove 18a to be screw fitted with the male screw groove 17a of the rotary shaft 17 formed on the inner wall surface. The propeller shaft 18 is configured, for example, in a circular column shape or a polygonal column shape provided with a key for preventing rotation, so that even if the rotary shaft 17 is rotated, it cannot be rotated about the rotation center of the rotary shaft 17. Therefore, when the rotary shaft 17 is rotated, the rotational force of the rotary shaft 17 is converted to a force for moving the propeller shaft 18 in the axial direction of the rotary shaft 17 by the engagement between the male screw groove 17a and the female screw groove 18a. When the drive of the motor 10 is stopped, the propeller shaft 18 stops at the same position due to the frictional force from the engagement between the male screw groove 17a and the female screw groove 18a, where if the drive of the motor 10 is stopped when the target electric braking force is obtained, the propeller shaft 18 can be held at that position, desired electric braking force can be maintained and self-locking (hereinafter simply referred to as "lock") can be performed.

The piston 19 is arranged so as to surround the outer periphery of the propeller shaft 18, and is formed by a bottomed cylindrical member or a polygonal cylindrical member and arranged such that the outer peripheral surface comes into contact with the inner wall surface of the hollow portion 14a formed in the body 14. A structure is such that a seal member 22 is provided on the inner wall surface of the body 14 and W/C pressure can be applied to the end face of the piston 19 so that brake fluid does not leak out between the outer peripheral surface of the piston 19 and the inner wall surface of the body 14. The seal member 22 is used to generate a reaction force for returning the piston 19 at the time of release control after the lock control. Since the seal member 22 is provided, basically, even if the brake pad 11 and the piston 19 are pushed in within a range not exceeding the elastic deformation amount of the seal member 22 by the tilted brake disc 12 during turning, they are pushed back toward the brake disc 12 so that the gap between the brake disc 12 and the brake pad 11 is held at a predetermined clearance (clearance C2 in FIG. 2).

In addition, to prevent the piston 19 from rotating about the rotation center of the rotary shaft 17 even if the rotary shaft 17 rotates, when the propeller shaft 18 is provided with a rotation prevention key, the piston is provided with a key groove in which the key slides, and when the propeller shaft 18 has a polygonal column shape, the piston has a polygonal cylindrical shape corresponding thereto.

The brake pad 11 is arranged at the distal end of the piston 19, and the brake pad 11 is moved in the left-right direction in the plane of drawing accompanying the movement of the piston 19. Specifically, the piston 19 is movable in the left direction in the plane of drawing accompanying the movement of the propeller shaft 18, and is movable in the left direction in the plane of drawing independently from the propeller shaft 18 when the W/C pressure is applied to the end of the piston 19 (the end opposite to the end where the brake pad 11 is arranged). Then, if the brake hydraulic pressure in the hollow portion 14a is not applied (W/C pressure=0) when the propeller shaft 18 is at the release position (the state before the motor 10 is rotated), which is the standby position in the normal release, the piston 19 is moved in the right direction in the plane of drawing by the elastic force of the seal member 22 to be described later, and the brake pad 11 can be separated away from the brake disc 12. Furthermore, when the motor 10 is rotated and the propeller shaft 18 is moved in the left direction in the plane of drawing from the initial position, even if the W/C pressure becomes 0, the movement of the piston 19 in the right direction in the plane of drawing is regulated by the moved propeller shaft 18 and the brake pad 11 is held in place. The clearance C1 in FIG. 2 indicates the distance between the distal end of the propeller shaft 18 and the piston 19. After the release of the EPB is completed, the propeller shaft 18 is fixed in position with respect to the body 14. On the other hand, since the position of the piston 19 changes in a state where the brake hydraulic pressure is not applied due to the subsequent environmental changes such as the temperature at the time of hydraulic braking and the like, the clearance C1 fluctuates. The EPB release control is performed to return the clearance C1 in addition so that the clearance C2 can be maintained even if it fluctuates, which becomes a factor of longer response time.

In the wheel brake mechanism configured as described above, when the service brake 1 is operated, the piston 19 is moved in the left direction in the plane of drawing based on the W/C pressure generated thereby so that the brake pad 11 is pressed against the brake disc 12 and the service brake force is generated. Furthermore, when the EPB 2 is operated, the spur gear 15 is rotated by driving the motor 10, and the spur gear 16 and the rotary shaft 17 are accordingly rotated, so that the propeller shaft 18 is moved toward the brake disc 12 (left direction in the plane of drawing) based on the engagement between the male screw groove 17a and the female screw groove 18a. The distal end of the propeller shaft 18 thereby comes into contact with the piston 19 and presses the piston 19, whereby the piston 19 is also moved in the same direction, so that the brake pad 11 is pressed against the brake disc 12 and an electric braking force is generated. Therefore, a shared wheel brake mechanism that generates a brake force for both the operation of the service brake 1 and the operation of the EPB 2 can be adopted.

In the vehicle brake device of the embodiment, it is possible to confirm the generation state of the electric braking force by the EPB2 or recognize the current detection value by confirming the current detection value of the current sensor (not shown) for detecting the current through the motor 10.

A front-rear G sensor 25 detects G (acceleration) in the front-rear direction (advancing direction) of the vehicle and transmits a detection signal to the EPB-ECU 9.

An M/C pressure sensor 26 detects the M/C pressure in the M/C5 and transmits a detection signal to the EPB-ECU 9.

A temperature sensor 28 detects the temperature of the wheel brake mechanism (e.g., a brake disc) and transmits a detection signal to the EPB-ECU 9.

A wheel speed sensor 29 detects the rotation speed of each wheel and transmits a detection signal to the EPB-ECU 9. Although the wheel speed sensor 29 is actually provided one for each wheel, detailed illustration and description thereof will be omitted here.

The EPB-ECU 9 is configured by a well-known microcomputer including a CPU, ROM, RAM, I/O, and the like, and performs parking brake control by controlling rotation of the motor 10 according to a program stored in ROM or the like.

The EPB-ECU 9 inputs, for example, a signal corresponding to the operation state of an operation switch (SW) 23 provided on an instrumental panel (not shown) in the vehicle compartment, and drives the motor 10 according to the operation state of the operation SW 23. Furthermore, the EPB-ECU 9 executes lock control, release control, and the like based on the current detection value of the motor 10, and recognizes that the lock control is being performed based on the control state or that the wheel is in the lock state by the lock control, and that the release control is being performed or that the wheel is in the release state (EPB release state) by the release control. Then, the EPB-ECU 9 outputs a signal for performing various displays to the indicator lamp 24 provided on the instrumental panel.

The vehicle brake device configured as described above basically performs an operation of generating a braking force in the vehicle by generating the service brake force by the service brake 1 when the vehicle is traveling. Furthermore, when the vehicle is stopped by the service brake 1, the driver performs operations such as pressing the operation SW 23 to operate the EPB 2 and generate the electric braking force thus maintaining the stopped state, and then releasing the electric braking force. That is, as the operation of the service brake 1, when the driver operates the brake pedal 3 while the vehicle is traveling, the brake hydraulic pressure generated in the M/C5 is transmitted to the W/C6 thus generating the service brake force. Moreover, as the operation of the EPB 2, the piston 19 is moved by driving the motor 10, and the electric braking force is generated by pressing the brake pad 11 against the brake disc 12 to have the wheels in the lock state, or the electric braking force is released by separating the brake pad 11 from the brake disc 12 to have the wheels in the release state.

Specifically, the electric braking force is generated or released by the lock/release control. In the lock control, the EPB 2 is operated by forward rotating the motor 10, the rotation of the motor 10 is stopped at a position where a desired electric braking force can be generated by the EPB 2, and this state is maintained. A desired electric braking force is thereby generated. In the release control, the EPB 2 is operated by reverse rotating the motor 10, and the electric braking force generated in the EPB 2 is released.

Furthermore, even when the vehicle is traveling, for example, there are situations where it is effective to use the EPB 2 such as at the time of an emergency, automatic driving, failure in the service brake 1, or the like. When the EPB 2 is used when the vehicle is traveling, it is preferable that the EPB 2 have a fast response speed. Therefore, when a predetermined condition (details will be described later) is satisfied, the EPB-ECU 9 executes a positional control of driving the motor 10 and moving the propeller shaft 18 that transmits the driving force of the motor 10 to the brake pad 11 toward the brake disc 12 as compared to when a predetermined condition is not satisfied. Moreover, when determining that generation of the electric braking force by the EPB 2 is necessary after executing the positional control, the EPB-ECU 9 executes the braking control of driving the motor 10 and pressing the brake pad 11 toward the brake disc 12.

Figure 8:
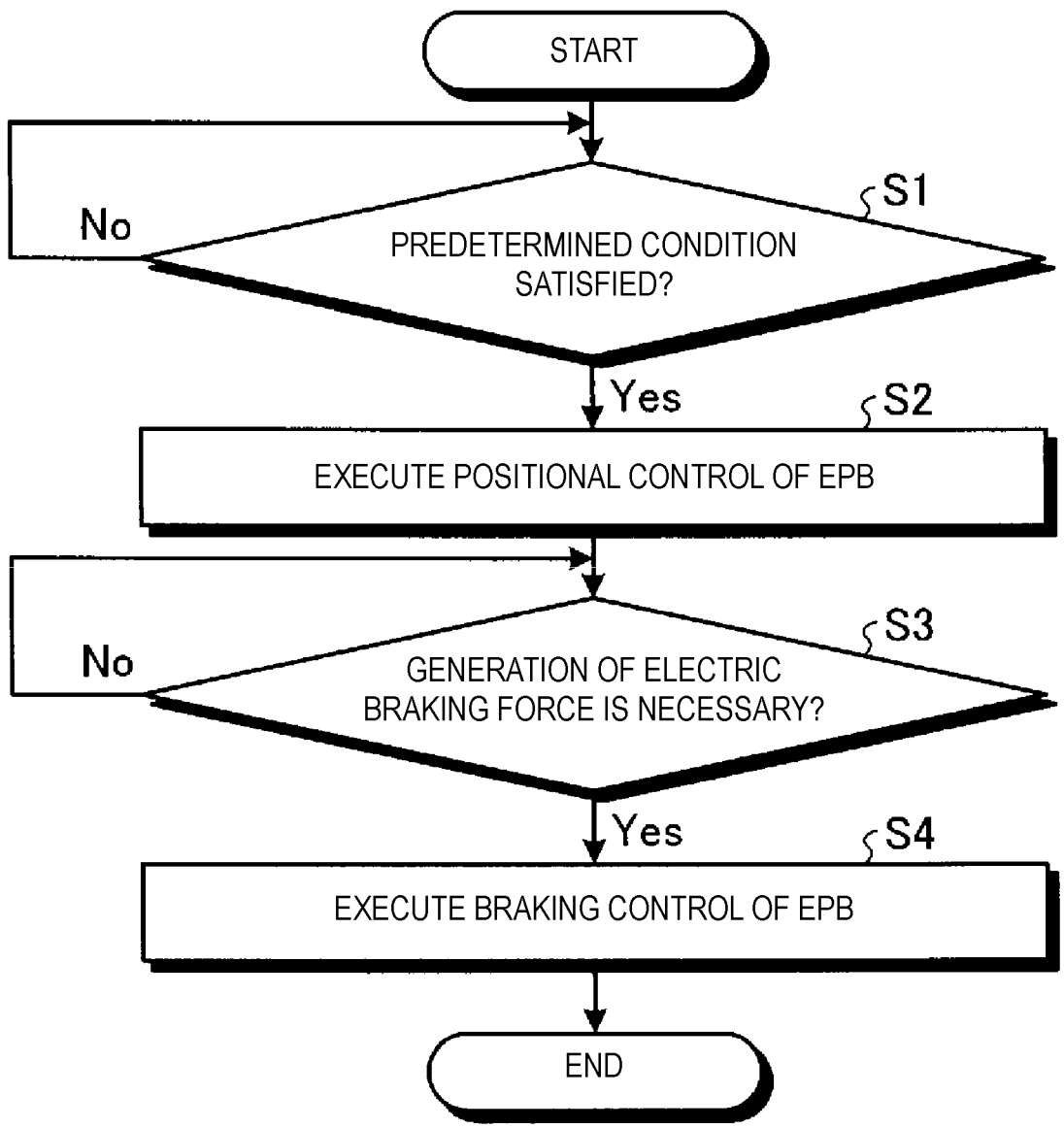
FIG. 8 is a flowchart showing a process performed by the brake control device of the embodiment.

The flow of processes of the EPB-ECU 9 described above is as shown in FIG. 8. As shown in FIG. 8, first, the EPB-ECU 9 determines whether or not a predetermined condition is satisfied (step S1), and proceeds to step S2 if Yes and returns to step S1 if No.

In step S2, the EPB-ECU 9 executes the positional control of the EPB 2 described above. Next, the EPB-ECU 9 determines whether or not generation of the electric braking force of the EPB 2 is necessary (step S3), and proceeds to step S4 if Yes and returns to step S3 if No. In step S4, the EPB-ECU 9 executes the braking control of the EPB 2 described above. Hereinafter, the positional control and the braking control will be described in detail.

First, regarding the positional control, a case where the predetermined condition described above is satisfied is, for example, a case where the EPB 2 is in a situation of being considered to be used soon, and a braking request to the vehicle is made. As the braking request, for example, the following (1) to (7) can be considered.

(1) Operation of the brake pedal 3 by the driver (e.g., operation at a predetermined frequency or higher and/or at a predetermined strength or higher)

(2) Operation of the operation SW 23 for operation of the EPB2 by the driver (3) Downshift operation by the driver (4) Deceleration instruction by obstacle detection (5) Deceleration instruction during parking control (6) Deceleration instruction to stop target position (7) Detection of abnormality in service brake 1

In addition, a case where the predetermined condition described above is satisfied, for example, is when a braking preparation request to the vehicle is made. As the braking preparation request, for example, the following (11) to (16) can be considered.

(11) Driver's accelerator off operation

(12) Driver's instruction to start automatic parking system

(13) Start in R range, change from other range to R range

(14) Obstacle detection by vehicle system

(15) Standby state of automatic parking system

(16) Detection of abnormality related to vehicle speed maintenance control

Furthermore, regarding the braking control, a case where generation of the electric braking force by the EPB 2 is determined to be necessary is, for example, the following cases (21) to (23).

(21) Deceleration of the vehicle is less than a predetermined value even if the brake pedal 3 is operated.

(22) A certain difference or more exists between the target deceleration and the actual deceleration when braking is being executed by the service brake 1.

(23) Case where the EPB 2 is actually operated after the operation of the operation SW 23 for operating the EPB 2 by the driver.

Figure 3:
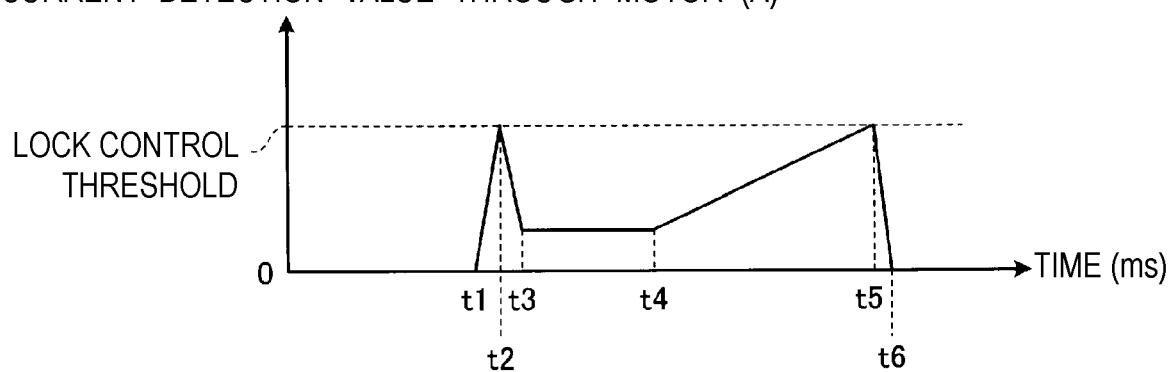
FIG. 3 is a graph showing how the current detection value of the motor changes when normal lock control is performed in an EPB of the embodiment.

Next, before the specific example of the positional control, for comparison, how the current detection value of the motor 10 changes when the normal lock control is performed in the EPB 2 will be described with reference to FIG. 3. FIG. 3 is a graph showing how the current detection value of the motor 10 changes when normal lock control is performed in an EPB 2 of the embodiment.

In the graph of FIG. 3, the vertical axis represents the current detection value (A) of the motor 10, and the horizontal axis represents the time (ms) (the same applies to FIGS. 4, 5A, 5B, and 6). Hereinafter, the current detection value of the motor 10 may be simply referred to as "current value". The drive of the motor 10 is started at time t1, the current value of the inrush current reaches its peak at time t2, and the current value becomes a stable value at time t3. Thereafter, the current value starts to increase at time t4. The reason the current value starts to increase is because, for example, the distal end of the propeller shaft 18 in FIG. 2 comes into contact with the piston 19 (i.e., the clearance C1 becomes zero). Alternatively, when increase in the load on the motor 10 is small even if the distal end of the propeller shaft 18 comes into contact with the piston 19, the reason the current value starts to increase includes the brake pad 11 in FIG. 2 coming into contact with the brake disc 12 (i.e., the clearance C2 becomes zero). In the following, as an example, description will be made assuming that the current detection value of the motor 10 starts to increase when the distal end of the propeller shaft 18 of FIG. 2 comes into contact with the piston 19.

After time t4, the current value continues to increase until time t5, and at time t5, when the current value after the end of the inrush current exceeds the lock control threshold, the current through the motor 10 is turned off, and the current value becomes zero immediately thereafter at time t6. That is, the normal lock control is completed at time t6.

(First Method)

Figure 4:
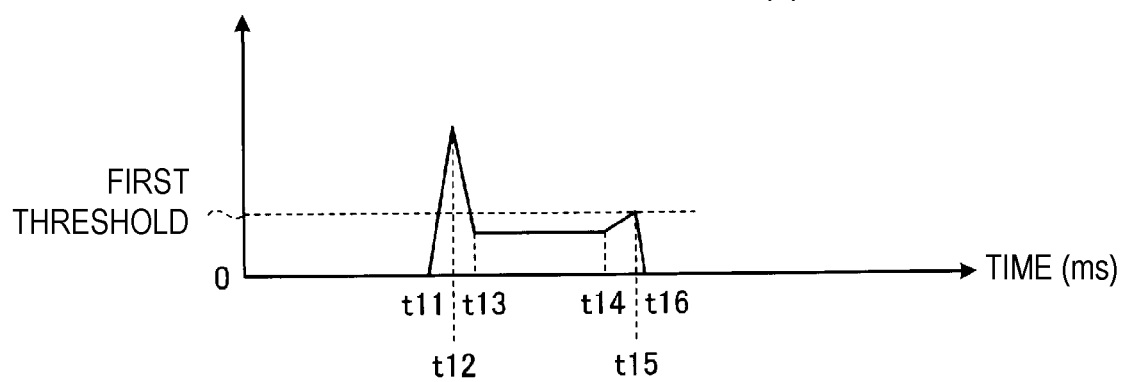
FIG. 4 is a graph showing how the current detection value of the motor changes when a positional control is performed through a first method in the EPB of the embodiment.

Next, with reference to FIG. 4, how the current detection value of the motor 10 changes when a positional control is performed through a first method in the EPB 2 will be described. FIG. 4 is a graph showing how the current detection value of the motor 10 changes when a positional control is performed through a first method in the EPB 2 of the embodiment.

Therefore, when a predetermined condition is satisfied, the EPB-ECU 9 executes the positional control of driving the motor 10 and moving the propeller shaft 18 that transmits the driving force of the motor 10 to the brake pad 11 toward the brake disc 12 as compared to when a predetermined condition is not satisfied. In the first method, when a predetermined condition is satisfied, the EPB-ECU 9 executes the positional control by driving the motor 10 and then stopping the drive of the motor 10 when the current value after the end of the inrush current exceeds a predetermined first threshold. Specifically, it is as follows.

First, the drive of the motor 10 is started at time t11, the current value of the inrush current reaches its peak at time t12, and the current value becomes a stable value at time t13. Subsequently, the current value starts to increase at time t14. Thereafter, when the current value after the end of the inrush current exceeds the first threshold at time t15, the current through the motor 10 is turned off, and the current value becomes zero immediately thereafter at time t16.

In this way, according to the first method, the positional control for moving the propeller shaft 18 to the brake disc 12 side can be executed. Therefore, the response speed of the hydraulic braking force and the electric braking force can be increased. For example, by reducing the clearance C1 and the clearance C2 in FIG. 2 before executing the braking control by the EPB2, it is possible to increase the response speed when executing the braking control by the EPB2 thereafter.

Note that the EPB-ECU 9 can, for example, detect the current value of the motor 10 (e.g., current value at time t13 to time t14 in FIG. 4) in a state where the brake pad 11 is not pressed against the brake disc 12 before or during the execution of the positional control, and set the first threshold based on the current value.

Furthermore, the EPB-ECU 9 may drive the motor 10 for a predetermined time so that the propeller shaft 18 returns in the direction opposite to the direction of the brake disc 12 after executing the positional control described above. Then, when a minute braking force generated by operating until the current value of the motor 10 exceeds the first threshold becomes a problem after the execution of the positional control described above, generation of unnecessary braking force can be prevented.

(Second Method)

Figure 5A:
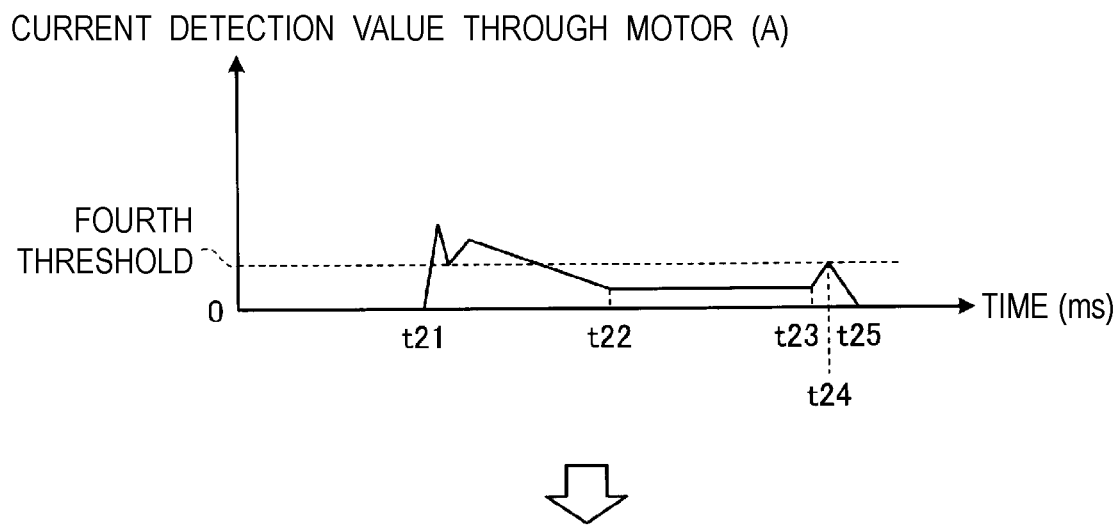
FIGS. 5A and 5B are graphs showing how the current detection value of the motor changes when a positional control is performed through a second method in the EPB of the embodiment.
Figure 5B:
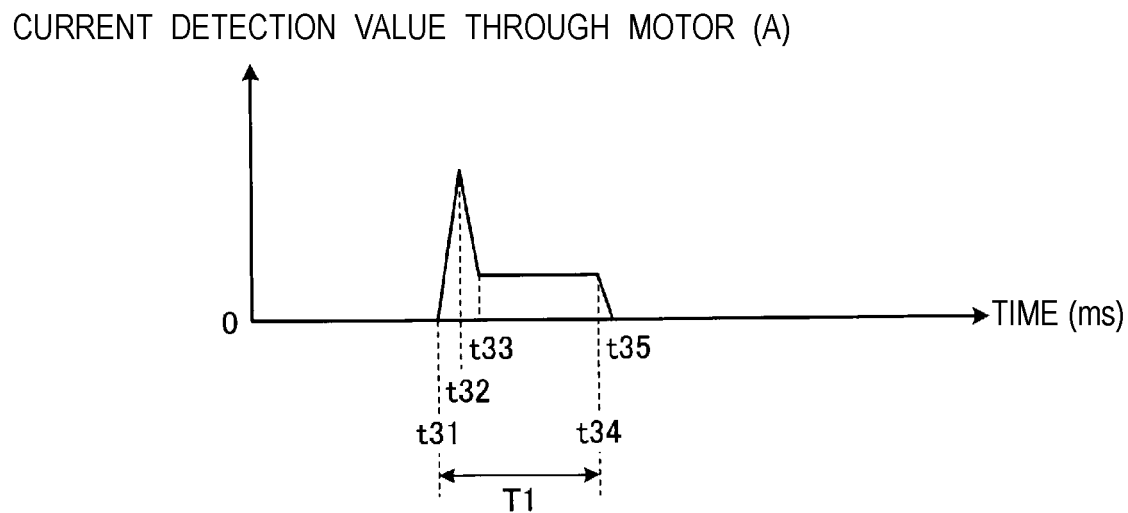

Next, with reference to FIGS. 5A and 5B, how the current detection value of the motor 10 changes when a positional control is performed through a second method in the EPB 2 will be described. FIGS. 5A and 5B are graphs showing how the current detection value of the motor 10 changes when a positional control is performed through a second method in the EPB 2 of the embodiment.

In the second method, when a predetermined condition is satisfied, the EPB-ECU 9 executes the positional control by driving the motor 10 to return the propeller shaft 18 to a predetermined position in a direction opposite to the direction of the brake disc 12 (so-called full release is performed) and then moving the propeller shaft by a first predetermined distance in the direction of the brake disc 12. Specifically, it is as follows.

First, the full release will be described with reference to FIG. 5A. The drive of the motor 10 (drive for moving the propeller shaft 18 to the right side of FIG. 2) is started at time t21, and the current value becomes a stable value at time t22. Thereafter, the current value starts to increase at time t23. The reason the current value starts to increase is because the right side of the propeller shaft 18 in FIG. 2 comes in contact with another member. Thereafter, when the current value after time t22 exceeds the fourth threshold for the first time at time t24, the current through the motor 10 is turned off, and the current value becomes zero immediately thereafter at time t25. The full release is completed at this time t25.

Next, the positional control will be described with reference to FIG. 5B. The drive of the motor 10 is started at time t31, the current value of the inrush current reaches its peak at time t32, and the current value becomes a stable value at time t33. Thereafter, the current through the motor 10 is turned off at time t34, at which a predetermined time T1 gas elapsed from time t31, and the current value becomes zero immediately thereafter at time t35.

In this way, according to the second method, the positional control for moving the propeller shaft 18 to the brake disc 12 side can be executed. Furthermore, the current through the motor 10 can be turned off without detecting an increase in the current value in the positional control by setting the predetermined time T1 in advance.

(Third Method)

Figure 6:
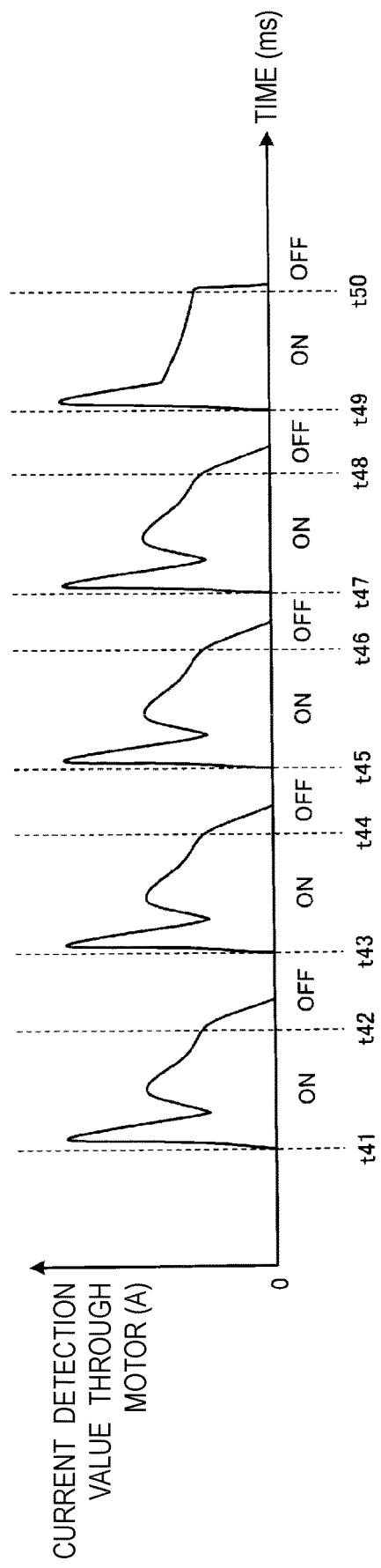
FIG. 6 is a graph showing how the current detection value of the motor changes when a positional control is performed through a third method in the EPB of the embodiment.

Next, with reference to FIG. 6, how the current detection value of the motor 10 changes when a positional control is performed through a third method in the EPB 2 will be described. FIG. 6 is a graph showing how the current detection value of the motor 10 changes when a positional control is performed through a third method in the EPB 2 of the embodiment.

In the third method, when a predetermined condition is satisfied, the EPB-ECU 9 executes the positional control by repeating driving and stopping of the motor 10 in minute time units and determining that the propeller shaft 18 has moved to the target position and terminating the drive of the motor 10 when a waveform pattern of the current value becomes other than a predetermined pattern. Specifically, it is as follows.

In FIG. 6, the time zone in which the motor 10 is driven is represented as "ON", and the time zone in which the motor 10 is stopped (strictly speaking, also includes the time zone in which the motor 10 moves slightly by inertia after the current through the motor 10 is cut off) is represented as "OFF". That is, times t41, t43, t45, t47, and t49 are timings at which the current through the motor 10 is turned on, and times t42, t44, t46, t48, and t50 are timings at which the current through the motor 10 is turned off. The waveform pattern after time t49 is different from that before as the distal end of the propeller shaft 18 in FIG. 2 comes into contact with the piston 19 in the time zone from time t49 to time t50.

More specifically, for example, the change rate (decreasing speed) of the current immediately after each of times t42, t44, t46, and t48 is the same, and the change rate of the current immediately after t50 is different therefrom, so that it can be determined that the distal end of the propeller shaft 18 in FIG. 2 has come into contact with the piston 19. Therefore, the drive of the motor 10 is terminated immediately after time t50.

In this way, according to the third method, the positional control can be executed by repeating the driving and stopping of the motor 10 in minute time units and terminating the drive of the motor 10 based on the change in the waveform pattern of the current value.

In the example described above, the determination is made based on the waveform pattern of the current value, but this is not the sole case, and the determination may be made based on the waveform pattern of the motor rotation speed.

Furthermore, when a predetermined condition is satisfied, the EPB-ECU 9 may execute the positional control by, rather than repeating the driving and stopping of the motor 10 in minute time units from the beginning, driving and then stopping the motor 10, and determining that the propeller shaft 18 has moved to the target position and terminating the drive of the motor 10 when a waveform pattern of the subsequent motor rotation speed becomes other than a predetermined pattern.

Specifically, for example, the EPB-ECU 9 drives the motor 10 so as to move the propeller shaft 18 $y$ a second predetermined distance in the direction of the brake disc 12 before executing the positional control. Alternatively, for example, the EPB-ECU 9 moves the brake pad 11 by a second predetermined distance in the direction of the brake disc 12 by the hydraulic pressure generated by the service brake 1 (hydraulic brake device) before executing the positional control.

(Fourth Method)

Next, a case where the positional control is performed through a fourth method in the EPB2 will be described. When the service brake 1 of one or more wheels of the plurality of wheels becomes abnormal, or when abnormality is predicted to occur as a case where a predetermined condition is satisfied, the EPB-ECU 9 executes the positional control for the EPB 2 of the wheel.

For example, assume that a vehicle has two front wheels and two rear wheels, two front wheels are equipped with the service brake 1, and two rear wheels are equipped with both the service brake 1 and the EPB 2. In this case, when failure of the service brake 1 of the two rear wheels is detected, the EPB-ECU 9 executes the positional control for the EPB 2 of the two rear wheels. Then, when a deceleration request is made from the vehicle or the driver, the EPB-ECU 9 generates the hydraulic braking force by the service brake 1 for the two front wheels and generates the electric braking force by the EPB 2 for the two rear wheels. In this case, the positional control is performed in advance for the two rear wheels, and hence the EPB 2 has fast response speed.

In this way, according to the fourth method, the electric braking force by the EPB 2 can be generated at a fast response speed for the wheel by executing the positional control for the EPB 2 of the wheel in which the service brake 1 has become abnormal (or predicted that abnormality will occur (the same applies hereinafter)). Note that the location of the wheels provided with the EPB2 and the location of the wheel that execute the positional control when the service brake 1 becomes abnormal are not limited to the examples described above and, for example, the EPB 2 may be provided on all wheels, and the positional control may be executed for the EPBs 2 of all the wheels in which the service brake 1 has become abnormal.

(Fifth Method)

Next, with reference to FIGS. 7A-7C, how the current detection value of the motor 10 changes when a positional control is performed through a fifth method in the EPB 2 and then a braking control of the EPB 2 is performed thereafter will be described. FIGS. 7A-7C are graphs showing how the current detection value of the motor 10 changes when a positional control is performed through a fifth method in the EPB 2 of the embodiment, and then a braking control of the EPB 2 is performed thereafter.

In the fifth method, the EPB-ECU 9 executes the positional control when the brake pedal 3 is operated at a predetermined frequency or higher and/or a predetermined strength or higher as a case where the predetermined condition is satisfied. Moreover, when the deceleration of the vehicle is less than a predetermined value even when the brake pedal 3 is operated as a case where generation of the electric braking force by the EPB 2 is determined to be necessary after executing the positional control, the EPB-ECU 9 executes the braking control. Specifically, it is as follows.

In the graph of FIG. 7A, the vertical axis represents the deceleration request, that is, here, as an example, whether the driver has operated the brake pedal 3 is represented with "ON (operating)" and "OFF (not operating), and the horizontal axis represents the time (ms).

In the graph of FIG. 7B, the vertical axis represents the generated deceleration and the horizontal axis represents the time (ms). The graph of FIG. 7B indicates that before time t70, for the generated deceleration, only the naturally generating amount (deceleration due to mechanical resistance etc.) is generated, that is, even if the brake pedal 3 is operated, the hydraulic braking force is not generated.

In the graph of FIG. 7C, the vertical axis represents the current detection value (A) of the motor 10, and the horizontal axis represents the time (ms).

First, from time t61 to time t65, the driver is operating (depressing) the brake pedal 3 (FIG. 7A). In this case, for example, the EPB-ECU 9 starts the positional control assuming that the brake pedal 3 is operated with a predetermined strength or higher at the time t62. That is, the drive of the motor 10 is started at time t62, the current through the motor 10 is turned off at time t63, and the current value becomes zero immediately after that at time t64. The positional control is thereby completed. The positional control executed at the times t62 to t64 is the same as in the case of FIG. 4, and thus detailed description thereof will be omitted.

Thereafter, the driver operates (depresses) the brake pedal 3 from time t66 to time t67 and from time t68 to time t73 (FIG. 7A). Therefore, at time t69, as a case where generation of the electric braking force by the EPB 2 is determined to be necessary, the EPB-ECU 9 executes the braking control assuming the deceleration of the vehicle is less than the predetermined value even if the brake pedal 3 is operated. Specifically, it is as follows.

The drive of the motor 10 is started at time t69, and the current value starts to increase at time t70. Thereafter, the current value continues to increase until time t71, the current through the motor 10 is turned off at time t71, and the current value becomes zero immediately thereafter at time t72. That is, the braking control is completed at time t72. The braking control executed at the times t69 to t72 is the same as in the case of FIG. 3, and thus detailed description thereof will be omitted.

In this way, according to the fifth method, for example, even if the service brake 1 of one of the wheels has a failure, and the EPB-ECU 9 does not detect the failure, the positional control is executed based on the operation of the brake pedal 3 and the braking control of the EPB 2 is executed based on the condition that the deceleration of the vehicle is less than a predetermined value even if the brake pedal 3 is operated, and the like. Thus, the braking control by the EPB2, which has a fast response speed, can be realized. That is, as the positional control is executed from the time t62 to t64, the time period from time t69, at which the braking control is started, until time t70, at which increase in the current value is started, when executing the braking control is shortened.

It should be noted that the information on the predetermined frequency and the predetermined strength described above may be set in advance, or may be learned and set based on the history of the driving operation by the driver and the behavior of the vehicle.

(Sixth Method)

Figure 9:
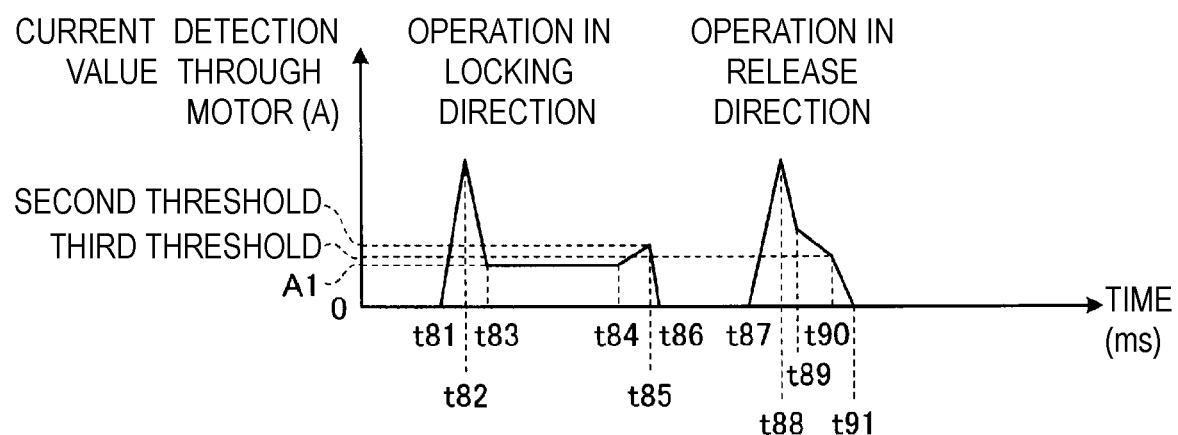
FIG. 9 is a graph showing how the current detection value of the motor changes when a positional control is performed through a sixth method in the EPB of the embodiment.

Next, with reference to FIG. 9, how the current detection value of the motor 10 changes when a positional control is performed through a sixth method in the EPB 2 will be described. FIG. 9 is a graph showing how the current detection value of the motor 10 changes when a positional control is performed through a sixth method in the EPB 2 of the embodiment.

In the sixth method, when a predetermined condition is satisfied, the EPB-ECU 9 executes the positional control by driving the motor 10 so as to move the propeller shaft 18 in the direction of the brake disc 12, stopping the drive of the motor 10 when a current value after the end of the inrush current exceeds a predetermined second threshold, and thereafter, driving the motor 10 so as to move the propeller shaft 18 in the direction opposite to the brake disc 12, and stopping the drive of the motor 10 when the current value falls below a predetermined third threshold. Specifically, it is as follows.

First, the drive of the motor 10 is started at time t81, the current value of the inrush current reaches its peak at time t82, and the current value becomes a stable value (A1) at time t83. Thereafter, the current value starts to increase at time t84. Thereafter, when the current value after the end of the inrush current exceeds the second threshold at time t85, the current through the motor 10 is turned off, and the current value becomes zero immediately thereafter at time t86.

Thereafter, at time t87, the drive of the motor 10 (drive for moving the propeller shaft 18 to the right side of FIG. 2) is started, and the current value of the inrush current reaches its peak at time t88. Then, at time t89, the deceleration speed of the current value becomes gradual, and at time t90, when the current value falls below the third threshold, the current through the motor 10 is turned off, and the current value becomes zero immediately thereafter at time t91.

Thus, according to the sixth method, the propeller shaft 18 can be set at an appropriate position based on the current detection value of the motor 10.

Note that the EPB-ECU 9 can, for example, detect the current value (A1) of the motor 10 in a state the brake disc 12 is not pressing the brake pad 11 before or during the execution of the positional control, and set the second threshold and the third threshold based on the current value. For example, since the third threshold is a threshold for detecting the release, it can be set to a value slightly larger than the current detection value A1 in FIG. 9. Thus, the influence of manufacturing variations of the wheel brake mechanism and environmental conditions (temperature etc.) can be suppressed to be small.

Modified Example

Next, a modified example will be described. For example, the EPB-ECU 9 may execute the positional control when the vehicle has not started traveling and the electric braking force is not generated as a case where a predetermined condition is satisfied. Then, when the vehicle travels thereafter, the hydraulic braking force and the electric braking force with a fast response speed can be realized.

The embodiment of the present disclosure has been exemplified above, but the embodiment described above is merely an example and is not intended to limit the scope of the disclosure. The embodiment described above can be implemented in various other forms, and various omissions, replacements, combinations, and changes can be made within a scope not deviating from the gist of the disclosure. In addition, specifications such as each configuration and shape (structure, type, number, etc.) can be appropriately changed and implemented.

For example, in the first method described above, the drive of the motor 10 is stopped when the current value exceeds the first threshold when executing the positional control, but this is not the sole case, and for example, the motor 10 may be driven in the reverse rotation direction by a small amount immediately after the drive of the motor 10 is stopped to slightly return the propeller shaft 18.

Furthermore, in the second method described above, in the positional control, it is realized by setting the time during which the current through the motor 10 is flowed to the predetermined time T1 when the propeller shaft 18 is moved by the first predetermined distance in the direction of the brake disc 12 after full release, but this is not the sole case, and it may be realized based on the integrated value of the current value, the rotation number of the motor 10, and the like.

Moreover, in the third method described above, determination is made that the distal end of the propeller shaft 18 in FIG. 2 has made contact with the piston 19 with the change rate (decreasing speed) of the current immediately after the current through the motor 10 is turned off, but this is not the sole case, and for example, the determination may be made with the change rate (decreasing speed) of the rotation number of the motor 10 immediately after the current through the motor 10 is turned off. Furthermore, the determination may be made based on the waveform pattern while the current through the motor 10 is turned on.

In addition, in the embodiment described above, a case of the disc brake type EPB has been described by way of an example, but the present disclosure can also be applied to the drum brake type EPB.

The invention claimed is:

1. A brake control device applied to a vehicle comprising:
   a hydraulic brake device that generates a hydraulic braking force by pressing a braking member with hydraulic pressure toward a member-to-be-braked that rotates integrally with a wheel; and
   an electric brake device that generates an electric braking force by pressing the braking member by driving a motor toward the member-to-be-braked, wherein
   a propeller shaft that transmits the driving force of the motor to the braking member toward the member-to-be-braked,
   a controller that controls the electric brake device is provided, and
   the controller executes a positional control that the propeller shaft is moved closer to the member-to-be-braked by controlling the motor when a predetermined condition is satisfied than a position when the predetermined condition is not satisfied,
   wherein the controller executes the positional control that the motor is stopped when a current value exceeds a predetermined first threshold after an inrush current flows.

2. The brake control device according to claim 1, wherein when the hydraulic brake device of one or more wheels among a plurality of wheels becomes abnormal or when abnormality is predicted to occur as a case where the predetermined condition is satisfied, the controller executes the positional control for the electric brake device of the wheel.

3. The brake control device according to claim 1, wherein the controller executes the positional control when the vehicle has not started traveling and the electric braking force is not generated as a case where the predetermined condition is satisfied.

4. A brake control device applied to a vehicle comprising:
   a hydraulic brake device that generates a hydraulic braking force by pressing a braking member with hydraulic pressure toward a member-to-be-braked that rotates integrally with a wheel; and
   an electric brake device that generates an electric braking force by pressing the braking member by driving a motor toward the member-to-be-braked, wherein a propeller shaft that transmits the driving force of the motor to the braking member toward the member-to-be-braked, a controller that controls the electric brake device is provided, and the controller executes a positional control that the propeller shaft is moved closer to the member-to-be-braked by controlling the motor when a predetermined condition is satisfied than a position when the predetermined condition is not satisfied, wherein the controller moves the braking member by a second predetermined distance in a direction toward the member-to-be-braked using the hydraulic pressure generated by the hydraulic brake device before executing the positional control.

5. The brake control device according to claim 4, wherein when the hydraulic brake device of one or more wheels among a plurality of wheels becomes abnormal or when abnormality is predicted to occur as a case where the predetermined condition is satisfied, the controller executes the positional control for the electric brake device of the wheel.

6. The brake control device according to claim 4, wherein the controller executes the positional control when the vehicle has not started traveling and the electric braking force is not generated as a case where the predetermined condition is satisfied.

7. A brake control device applied to a vehicle comprising:
a hydraulic brake device that generates a hydraulic braking force by pressing a braking member with hydraulic pressure toward a member-to-be-braked that rotates integrally with a wheel; and an electric brake device that generates an electric braking force by pressing the braking member by driving a motor toward the member-to-be-braked, wherein a propeller shaft that transmits the driving force of the motor to the braking member toward the member-to-be-braked, a controller that controls the electric brake device is provided, and the controller executes a positional control that the propeller shaft is moved closer to the member-to-be-braked by controlling the motor when a predetermined condition is satisfied than a position when the predetermined condition is not satisfied, wherein when the predetermined condition is satisfied, the controller executes the positional control by driving the motor so as to move the propeller shaft in the direction toward the member-to-be-braked, stopping the drive of the motor when a current value exceeds a predetermined first threshold after an inrush current flows, and thereafter, driving the motor to move the propeller shaft in the direction opposite to the member-to-be-braked, and stopping the drive of the motor when the current value falls below a predetermined second threshold.

8. The brake control device according to claim 7, wherein when the hydraulic brake device of one or more wheels among a plurality of wheels becomes abnormal or when abnormality is predicted to occur as a case where the predetermined condition is satisfied, the controller executes the positional control for the electric brake device of the wheel.

9. The brake control device according to claim 7, wherein the controller executes the positional control when the vehicle has not started traveling and the electric braking force is not generated as a case where the predetermined condition is satisfied.

* * * * *